United States Patent [19]
Rail et al.

[11] Patent Number: 5,680,611
[45] Date of Patent: Oct. 21, 1997

[54] DUPLICATE RECORD DETECTION

[75] Inventors: Peter D. Rail; Rene L. Alejandro, both of Plano, Tex.

[73] Assignee: Electronic Data Systems Corporation, Plano, Tex.

[21] Appl. No.: 536,413

[22] Filed: Sep. 29, 1995

[51] Int. Cl.$^6$ ........................................ G06F 3/14
[52] U.S. Cl. ............................... 395/612; 370/259
[58] Field of Search .................. 395/601, 602, 603, 604, 605, 606, 607, 608, 609, 610, 611, 612, 613, 614, 615, 234, 235, 245; 380/42, 49, 51; 370/259, 298, 310, 320, 321, 326

[56] References Cited

U.S. PATENT DOCUMENTS

| | | | |
|---|---|---|---|
| 5,111,395 | 5/1992 | Smith et al. | 395/245 |
| 5,185,886 | 2/1993 | Edem et al. | 395/607 |
| 5,287,270 | 2/1994 | Hardy et al. | 395/234 |
| 5,303,149 | 4/1994 | Janigian | 395/606 |
| 5,446,880 | 8/1995 | Balgeman et al. | 395/609 |
| 5,471,533 | 11/1995 | Wang et al. | 380/51 |
| 5,610,915 | 3/1997 | Elliott et al. | 370/259 |

OTHER PUBLICATIONS

B. Gregory Louis, "Cyclic Redundancy," *The C Users Journal*, vol. 10, No. 10, Oct., 1992, pp. 55–60.

*Primary Examiner*—Thomas G. Black
*Assistant Examiner*—Ruay Lian Ho
*Attorney, Agent, or Firm*—L. Joy Griebenow; Barton E. Showalter

[57] ABSTRACT

A method for detecting duplicate records generates a checksum (222) for each record and compares the generated checksum (222) to checksums stored in check files (30). In a particular application, a system (10) for processing call detail records utilizes a duplicate check module (28) that detects duplicate records using checksum processing.

20 Claims, 2 Drawing Sheets

DUPLICATE RECORD DETECTION

TECHNICAL FIELD OF THE INVENTION

This invention relates in general to the field of data processing, and more specifically to record processing and duplicate record detection.

BACKGROUND OF THE INVENTION

Telecommunications, insurance, banking, and other industries rely on computer systems to process, manipulate, and retrieve information. The information used by computers is often stored in files of various formats and sizes. In a records-based computer system, a file may contain a number of separate records which each provide information for a single transaction or occurrence to be processed by the computer. For example, a call detail record (CDR) is generated when a telephone call is placed.

Machine or human error may cause the same record to be submitted for processing more than once. For example, call detail records may be submitted more than once and cause duplicate billing to a customer. Duplicate records should be detected to maintain accuracy in a records-based computer system.

Historically, a brute-force approach has been used to detect duplicate records. This known method compares a record to a database of processed records. The time to read and compare large numbers of records becomes prohibitive using this method. Furthermore, the amount of file storage required for the database of processed records is impractical.

SUMMARY OF THE INVENTION

In accordance with the present invention, the disadvantages and problems associated with duplicate record detection has been substantially reduced or eliminated.

In accordance with one embodiment of the present invention, a method performed on a computer for identifying a duplicate record comprises generating a checksum using at least a portion of a record and comparing the generated checksum to a plurality of stored checksums to identify the record as a duplicate. The stored checksums are associated with a plurality of processed records.

Important technical advantages of the present invention include generating a checksum for each processed record and comparing the generated checksum to stored checksums of previously processed records. In particular, one or more checksums may be generated on selected fields of each record. By comparing checksums and not partial or whole records, the present invention can utilize fast searching techniques to detect duplicate records. Furthermore, the stored checksums occupy less space than their associated records. To further expedite searching, stored checksums may be arranged in different files based on a field of its associated record. In one embodiment, the present invention may be used in a call processing and billing center to detect duplicate call detail records (CDRs).

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

Figure 1:
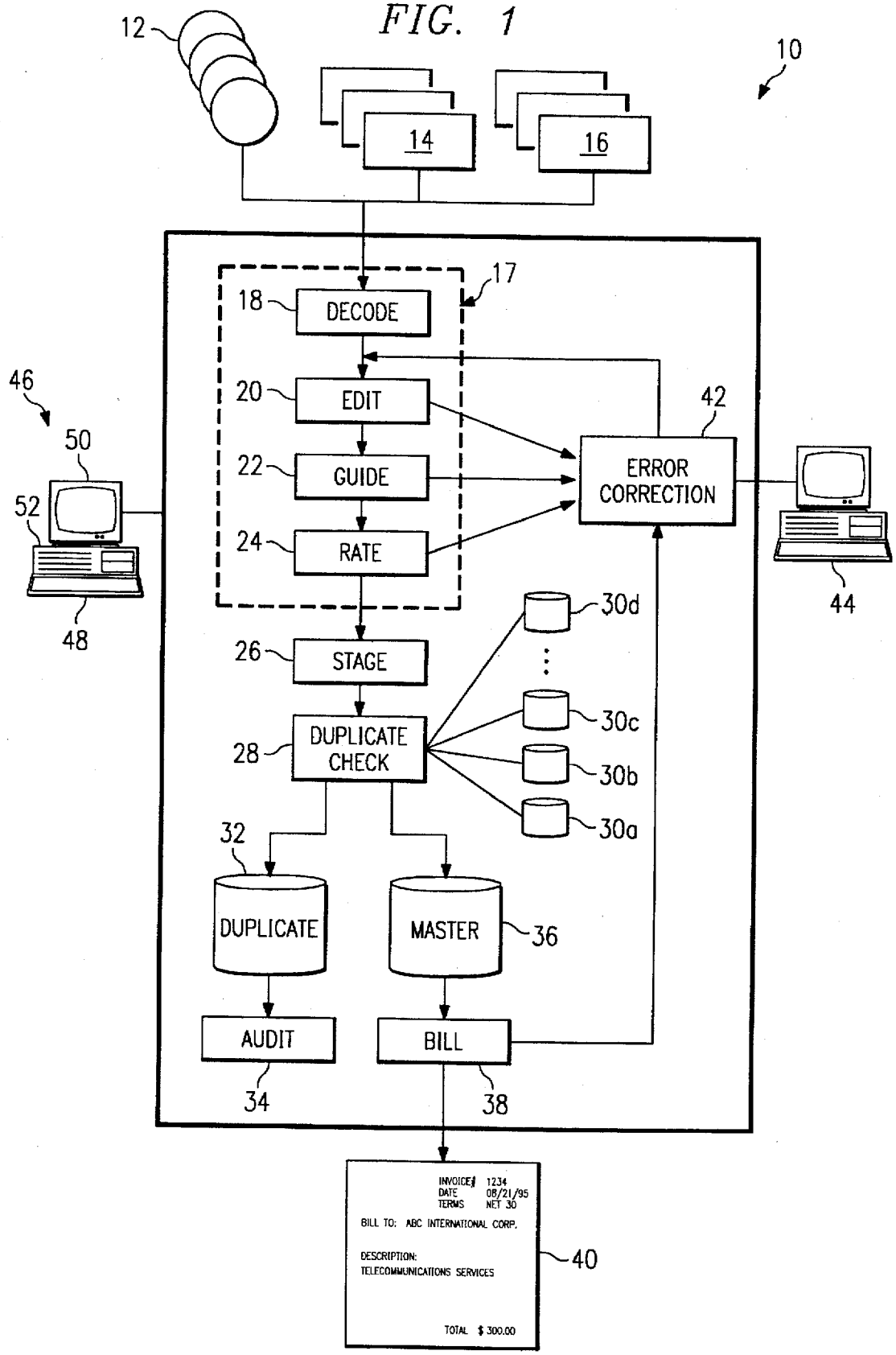
FIG. 1 illustrates a system for processing a call detail record.

FIG. 1 illustrates a system 10 for processing a call detail record (CDR). CDRs are created when a telephone customer places a telephone call. Generally, system 10 receives CDRs of various formats and types, processes the CDRs, and generates bills for delivery to the telephone customer. CDRs may come from a variety of sources, such as vendor tapes 12, private branch exchanges (PBXs) or other private switches 14, and public switches 16.

CDRs are transferred, locally or remotely, to an input module 17 of system 10 that includes one or more of the following: a decode module 18, an edit module 20, a guide module 22, a rate module 24, and a stage module 26. Decode module 18 receives CDRs from vendor tapes 12, private switches 14, and public switches 16 in various formats and protocols. Decode module 18 performs verification functions and converts the CDRs into a standard format for use in system 10. To perform the conversion function, decode module 18 identifies specific fields of the received CDRs and reorders the fields into a standard format. In addition, decode module 18 assigns a unique transaction identifier to each CDR. Edit module 20 receives the CDRs, now in a standard format, and edits the CDR to complete the field information. For example, edit module 20 may add the exchange and area code to a four digit extension generated from an internal call on a PBX.

Guide module 22 receives the converted and edited CDRs from edit module 20 and allocates each CDR to an internal cost center, account number, customer, or other responsible party. Guide module 22 utilizes customer tables to properly allocate each CDR to a responsible party. After a CDR is allocated, rate module 24 determines the proper charge for each call represented by a CDR. Rate module 24 may consider call distance, first minute rates, additional minute rates, and other standard or customer dependant factors to determine the cost of each call.

Stage module 26 stores each CDR before batch processing to detect duplicate CDRs. In one embodiment, CDRs are processed through input module 17 to stage module 26 during the day, and further batch processing of CDRs stored in stage module 26 occurs at night. It should be understood that system 10 may not include stage module 26 or may use stage module 26 to store several hours, several minutes, or any suitable time history of CDRs.

Duplicate check module 28, described in detail below with reference to FIG. 2, generates a checksum for each processed CDR. The checksum is one or a combination of values computed using the contents of at least a portion of each processed CDR. The generated checksum is then compared to stored checksums of previously processed CDRs located in check files 30a, 30b, 30c, and 30d, collectively referred to as check files 30. In one embodiment, check file 30a stores checksums of processed CDRs with a connect date field that indicates the call was placed in the current month, and check files 30b, 30c, and 30d contain checksums of CDRs processed in previous months. For example, if the current month is July, then check file 30a comprises checksums of CDRs with a connect date in July, check file 30b comprises checksums of CDRs with a connect date in June, check file 30c comprises checksums of CDRs with a connect date in May, and so on. Check files 30 may store checksums of CDRs for the past three months or more, depending on storage capabilities, the likelihood of receiving latent duplicate records, and other factors. As is described below with reference to FIG. 2, check files 30 may also store a transaction identifier in addition to the checksum for each processed CDR.

If duplicate check module 28 detects a duplicate CDR, then the duplicate CDR is stored in a duplicate file 32 and accessed by an audit module 34 for audit processing. If a duplicate is not detected, then the processed CDR is stored in a master file 36 for access by bill module 38 that generates a bill 40 to send to the telephone customer. In one embodiment, master file 36 may store all processed CDRs for a single month before releasing the CDRs to bill module 38.

Error correction module 42 is coupled to edit module 20, guide module 22, rate module 24, and bill module 38. Error correction module 42 receives a CDR from these modules when an error in the processing stream is detected. The CDR may then be automatically or manually corrected before passing back to edit module 20. Station 44 is coupled to error correction module 42 and allows a system operator to correct CDRs.

System 10 may operate on one or more computers, shown generally as computer 46. Computer 46 includes an input device 48, such as a keypad, touch screen, or other device that can accept information. Output device 50 conveys information associated with the operation of system 10, including digital data, visual information, or audio information. Both input device 48 and output device 50 may include fixed or removable storage media, such as magnetic computer disks, CD-ROM, or other suitable media to both receive output from and provide input to system 10. Processor 52 and its associated memory execute instructions and manipulate information in accordance with the operation of system 10 described above.

Figure 2:
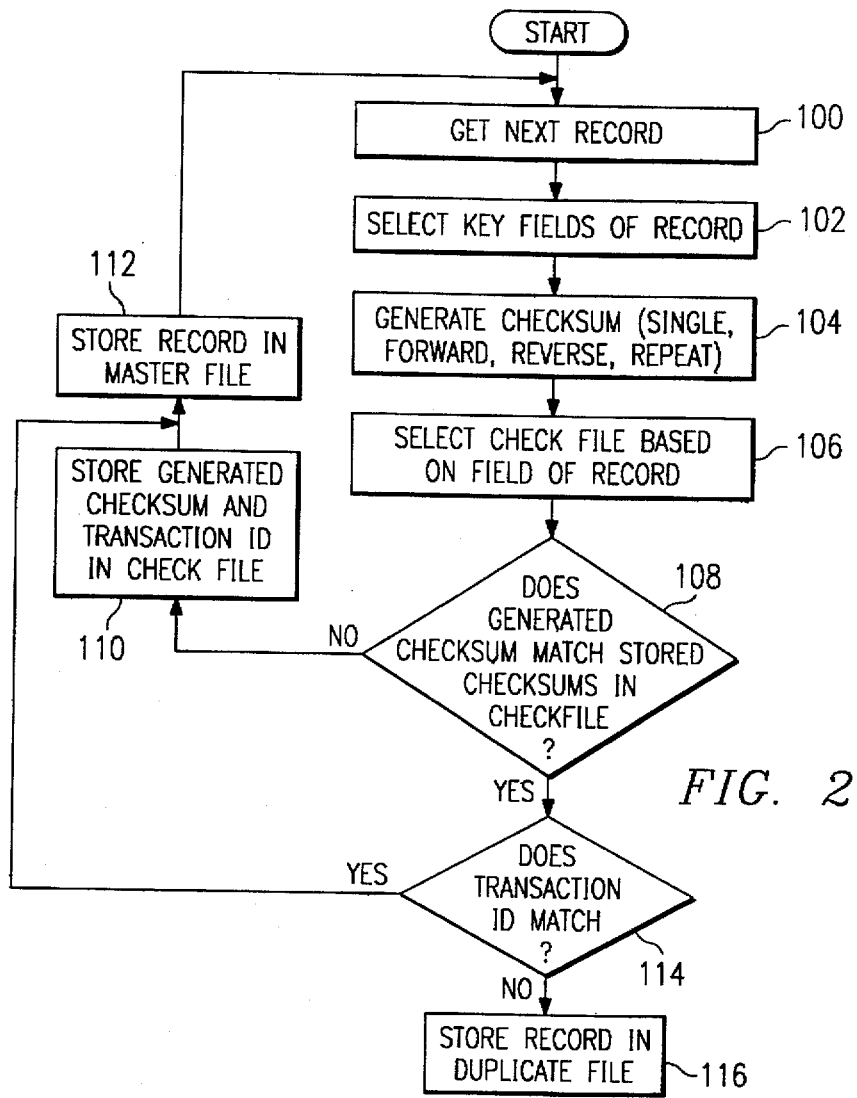
FIG. 2 illustrates a flow chart of a method for identifying a duplicate record.

FIG. 2 illustrates a flow chart of a method for identifying a duplicate record. Although the method of FIG. 2 may be used for detecting duplicate CDRs, such as the operation of duplicate check module 28 in system 10, this technique applies to duplicate record detection generally. After a record is received for processing at step 100, key fields of the record are then selected for checksum processing at step 102, if appropriate or desired. Selecting a few key fields from an entire record reduces the amount of data processed and stored during checksum processing. Using the example of CDR processing in FIG. 1, a complete CDR may occupy four thousand bytes or more of storage space, whereas selected key fields may occupy one hundred bytes or less. The selection of key fields provides a compression ratio of forty-to-one or more before checksum processing. An exemplary selection of key fields of a CDR for checksum processing is described below with reference to FIG. 3.

Using the selected key fields of the record, the method generates a checksum at step 104. In general, a checksum is one or a combination of values computed using the contents of at least a portion of the record. This may be accomplished using a cyclic redundancy checksum (CRC) routine that is common in computer communications applications. For example, a transmitting device may generate a CRC on an outgoing transmission block and append the CRC to the block for transmission. The receiver detects transmission errors by comparing the appended CRC with a locally calculated CRC. If the appended CRC and locally calculated CRC do not match, an error is detected and the block is re-transmitted. Any generally known CRC algorithm may be used, such as "CRC-32" recommended by IEEE Specification 802, "DEBB20E3" utilized in the popular PKZIP compression utility, or any other suitable checksum algorithm. Exemplary algorithms familiar to those skilled in the art are disclosed in the article "Cyclic Redundancy" by B. Gregory Louis, which appears in the October 1992 edition of *The C Users Journal*.

A variety of checksums may be generated for a single record at step 104. For example, a forward checksum may be generated using a single forward pass through the record. Alternatively, a reverse checksum may be generated by passing through the record in a reverse direction. A reverse checksum may be the result of reversing the grouping of key fields on a field, printable character, byte, or bit level. The resulting reverse checksum may then be used in combination with the forward checksum to provide additional record differentiation. A checksum may be generated by running the CRC algorithm through the key fields of the record multiple times. Furthermore, a checksum may comprise one or more values computed using a combination of these techniques. The present invention contemplates any suitable combination of repeating, reversing, or otherwise manipulating at least a portion of the record to generate a checksum.

A check file may be chosen based on a selected field of the record at step 106. For example, if the record is a call detail record (CDR), then check files 30 may be arranged based on a connect date of the CDR. Check files 30 may then store checksums associated with previously processed CDRs having a connect date field within a specified date range. For example, the date range may be by month, week, day, or other range depending on the amount of data that may be stored in a single file, the amount of CDRs processed, or other factors.

The method compares the generated checksum for the currently processed record with stored checksums in the selected check file at step 108. The small and fixed size of the generated and stored checksums allow the comparison step to utilize an efficient binary search technique. If no match is found, then the generated checksum is stored in the check file at step 110. In addition, a unique transaction identifier may also be stored with the generated checksum. If no duplicate is identified, the record currently being processed is stored in a master file at step 112. The method continues by getting the next record for processing at step 100.

If the generated checksum matches a stored checksum in the selected check file at step 108, then the transaction identifier of the current record and the transaction identifier associated with the matching stored checksum are compared at step 114. If the transaction identifiers do not match, then a duplicate has been identified and the record is stored in a duplicate file at step 116. However, if the transaction identifier of the current record matches the transaction identifier associated with the matching stored checksum, then the current record has been recycled and is not a duplicate. Using the example of CDR processing in FIG. 1, a CDR may be recycled through error correction module 42. Since the checksum and transaction ID of this recycled record have already been stored in check file 30, block 110 is bypassed and the CDR is stored in master file 36 at step 112. This additional checking of the transaction identifier allows a record to be corrected and re-processed without detecting it as a duplicate record.

The use of a checksum to detect duplicate records provides several advantages. Key field selection and checksum generation drastically reduce storage requirements. In one embodiment, a checksum comprising a forward checksum component and a reverse checksum component occupy only eight bytes and may represent a processed record of four thousand bytes or more. In addition, the use of checksums also provides enhanced processing capabilities. The checksums may be stored and optionally sorted in a fixed length file that allows for convenient and efficient binary searching to quickly detect duplicate entries.

Figure 3:
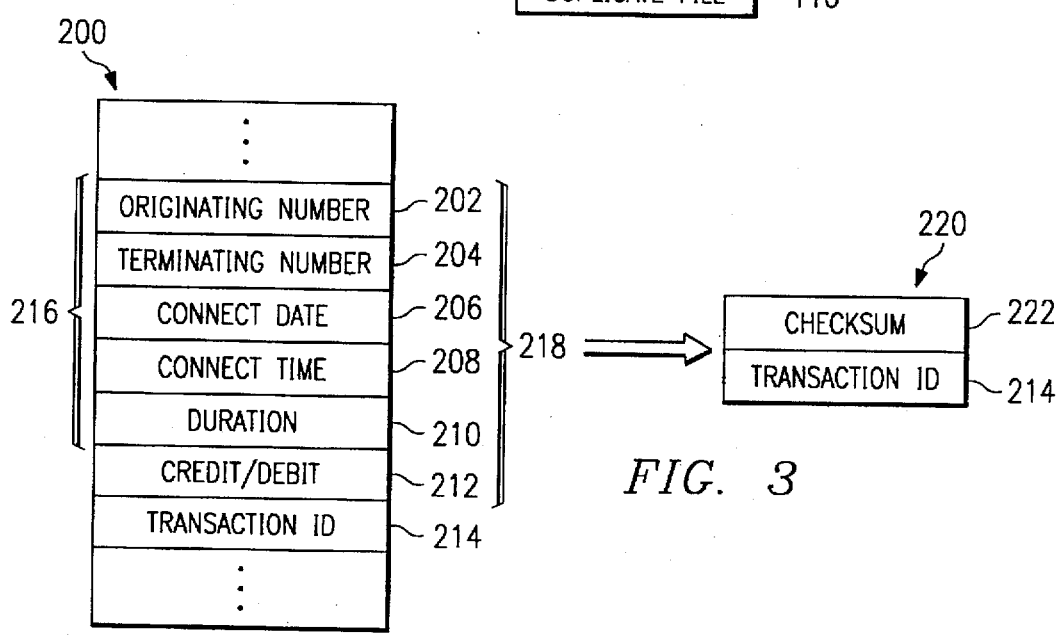
FIG. 3 illustrates a data structure for use in the system of FIG. 1.

FIG. 3 illustrates an exemplary data structure that may be used in system 10 to process CDRs. A CDR 200 is represented by a number of fields containing information on a telephone call. For example, an originating number field 202 comprises a ten digit number identifying the calling party and a terminating number field 204 comprises a ten digit number identifying the called party. A connect date field 206 indicates the date the connection was made and may be used, as described above, to store checksums into different check files 30. A connect time field 208 indicates the time of day the connection was made and a duration field 210 specifies the length of the call. A credit/debit field 212 is a logical field indicating whether the call should be charged or credited to a customer account. A transaction identifier 214 is added to the CDR by decode module 18 to uniquely identify the CDR from all other CDRs processed by system 10.

Different fields in CDR 200 may be selected to generate the checksum, and the selection of fields may depend on the type of call. For example, a standard call or a calling card call may utilize fields indicated by grouping 216 to generate a checksum. A pre-rated call may use fields indicated by grouping 218 to generate a checksum.

After generating a checksum, a check record 220 is stored in check files 30. Check record 220 comprises a generated checksum 222 which may comprise one or more individual checksums as described above. Transaction identifier 214 is included in both CDR 200 and check record 220, but is not included in the fields for checksum processing. Transaction identifier 214 may be excluded from both CDR 200 and check record 220 if system 10 does not need to recognize recycled CDRs.

Although system 10 has been described with reference to the processing and billing of call detail records (CDRs), it should be understood that system 10 may be adapted to detecting duplicates of records in a variety of situations. Any system that checks historical records for duplication of a uniquely identifiable event or transaction would find value in the performance gains and file storage savings offered by the use of checksums for duplicate record detection. One of ordinary skill in the art may adapt the teachings of the present invention to a variety of applications in the field of data processing.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method performed on a computer for identifying an individual record as a duplicate, comprising:

generating a checksum using at least a portion of an individual record; and comparing the generated checksum to a plurality of stored checksums to identify the individual record as a duplicate, the stored checksums are associated with a plurality of processed records.

2. The method of claim 1, wherein the step of generating a checksum comprises:

extracting a plurality of selected fields from the individual record; and generating a checksum using the selected fields.

3. The method of claim 1, wherein the individual record is a call detail record and the step of generating a checksum comprises:

extracting a plurality of selected fields from the individual record, the selected fields comprising an originating number field, a terminating number field, a connect date field, a connect time field, and a duration field; and generating a checksum using the selected fields.

4. The method of claim 1, wherein the step of generating a checksum comprises:

extracting a plurality of selected fields from the individual record;

generating a forward checksum using the selected fields; and generating a reverse checksum using the selected fields.

5. The method of claim 1, wherein the step of generating a checksum comprises:

extracting a plurality of selected fields from the individual record; and generating a checksum in response to a repetition of the selected fields.

6. The method of claim 1, wherein the individual record is a call detail record and the stored checksums are associated with call detail records having a connect date field within a specified date range.

7. The method of claim 1, comprising the step of storing the individual record in a duplicate file if the individual record is a duplicate.

8. A method for processing a call detail record, comprising:

generating the call detail record in response to a telephone call;

generating a checksum using at least a portion of the call detail record; and comparing the generated checksum to a plurality of stored checksums to identify the call detail record as a duplicate, the stored checksums are associated with a plurality of processed call detail records.

9. The method of claim 8, comprising the step of converting the call detail record into a standard format before generating a checksum.

10. The method of claim 8, comprising the step of rating the call detail record before generating a checksum.

11. The method of claim 8, wherein the step of generating a checksum comprises:

extracting a plurality of selected fields from the call detail record; and generating a checksum using the selected fields.

12. The method of claim 8, wherein the step of generating a checksum comprises:

extracting a plurality of selected fields from the call detail record;

generating a forward checksum using the selected fields; and generating a reverse checksum using the selected fields.

13. The method of claim 8, comprising the step of storing the call detail record in a duplicate file if the call detail record is a duplicate.

14. The method of claim 8, comprising the following steps:

storing the call detail record in a master file if the call detail record is not a duplicate; and generating bills in response to call detail records stored in the master file.

15. A system for processing a call detail record, comprising:

an input module operable to receive the call detail record;

a duplicate check module coupled to the input module, the duplicate check module operable to generate a checksum using at least a portion of the call detail record;

a check file coupled to the duplicate check module, the check file comprising a plurality of stored checksums associated with a plurality of processed call detail records; and the duplicate check module operable to compare the generated checksum to the stored checksums in the check file to identify the call detail record as a duplicate.

16. The system of claim 15, wherein the input module comprises:

a decode module operable to convert the call detail record into a standard format; and a rate module operable to assign a billing rate to the call detail record.

17. The system of claim 15, comprising a master file coupled to the duplicate check module, the master file operable to store the call detail record that is not identified as a duplicate.

18. The system of claim 15, comprising a duplicate file coupled to the duplicate check module, the duplicate file operable to store the call detail record that is identified as a duplicate.

19. The system of claim 15, comprising:

a master file coupled to the duplicate check module, the master file operable to store the call detail record that is not identified as a duplicate; and a bill module coupled to the master file, the bill module operable to generate a bill in response to the call detail record stored in the master file.

20. The system of claim 15, comprising:

a master file coupled to the duplicate check module, the master file operable to store the call detail record that is not identified as a duplicate;

a bill module coupled to the master file, the bill module operable to generate a bill in response to the call detail record stored in the master file; and an error correction module coupled to the input module and the bill module, the error correction module operable to correct errors in the call detail record.

\* \* \* \* \*